United States Patent
Li et al.

(10) Patent No.: US 10,313,226 B2
(45) Date of Patent: Jun. 4, 2019

(54) MULTICAST IN MULTI-USER TRANSMISSIONS

(71) Applicant: Apple Inc., Cupertino, CA (US)

(72) Inventors: Guoqing Li, Cupertino, CA (US); Yong Liu, Cupertino, CA (US); Joonsuk Kim, Saratoga, CA (US); Christiaan A. Hartman, Cupertino, CA (US); Su Khiong Yong, Palo Alto, CA (US); Syed A. Mujtaba, Santa Clara, CA (US); Matthew L. Semersky, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 15/256,013

(22) Filed: Sep. 2, 2016

(65) Prior Publication Data

US 2017/0070418 A1 Mar. 9, 2017

Related U.S. Application Data

(60) Provisional application No. 62/214,126, filed on Sep. 3, 2015.

(51) Int. Cl.
*H04L 12/18* (2006.01)
*H04W 76/40* (2018.01)
(Continued)

(52) U.S. Cl.
CPC ............ *H04L 45/16* (2013.01); *H04L 12/189* (2013.01); *H04L 61/2069* (2013.01); *H04W 76/40* (2018.02); *H04W 4/06* (2013.01)

(58) Field of Classification Search
CPC .......... H04L 45/16; H04L 69/22; H04W 84/12
See application file for complete search history.

(56) References Cited

U.S. PATENT DOCUMENTS

| | | | |
|---|---|---|---|
| 2012/0020356 A1* | 1/2012 | Ohno | H04L 45/16 370/390 |
| 2013/0229925 A1* | 9/2013 | Kitada | H04L 43/08 370/246 |

(Continued)

OTHER PUBLICATIONS

Yao Z., Mo L. "IEEE 802.11 Wireless LANs Virtual Link Mechanism" entire document, Feb. 2006.*

*Primary Examiner* — Xavier Szewai Wong
(74) *Attorney, Agent, or Firm* — Sterne, Kessler, Goldstein & Fox, PLLC

(57) ABSTRACT

Disclosed herein are system, method, and computer program product embodiments for selectively decoding a multicast subframe in a multi-user frame for a wireless communications protocol. Embodiments include transmitting a request frame including a multicast group address for a multicast group to an access point (AP). The AP can determine a multicast identifier for the multicast group based on the multicast group address in the request frame. The AP can also transmit a response frame including the determined multicast identifier to a station (STA). The STA can receive a multi-user frame containing a multicast subframe from the AP. The STA can determine whether the multicast subframe is destined for the STA based on the determined multicast identifier and a multicast identifier stored in a preamble of the multi-user frame. The STA can determine whether to decode the multicast subframe based on the determination of whether the multicast subframe is destined for the STA.

22 Claims, 7 Drawing Sheets

(51) Int. Cl.
*H04L 12/761* (2013.01)
*H04L 29/12* (2006.01)
*H04W 4/06* (2009.01)

(56) References Cited

U.S. PATENT DOCUMENTS

| | | | |
|---|---|---|---|
| 2014/0286226 A1* | 9/2014 | Seok | H04W 56/00 |
| | | | 370/312 |
| 2016/0205588 A1* | 7/2016 | Liu | H04L 69/04 |
| | | | 370/392 |
| 2016/0330685 A1* | 11/2016 | Asterjadhi | H04W 52/0212 |
| 2016/0330714 A1* | 11/2016 | Hedayat | H04W 72/1289 |
| 2016/0353357 A1* | 12/2016 | Asterjadhi | H04L 5/0055 |
| 2017/0359159 A1* | 12/2017 | Kim | H04L 1/16 |

\* cited by examiner

MULTICAST IN MULTI-USER TRANSMISSIONS

CROSS-REFERENCE TO RELATED APPLICATION

The present application claims benefit of provisional U.S. Patent Application No. 62/214,126, titled "Multicast in Multi-User Transmissions" filed on Sep. 3, 2015, which is incorporated herein by reference in its entirety.

BACKGROUND

Technical Field

This disclosure relates to the field of wireless communications, including multicast in multi-user transmissions in a wireless local area network (WLAN).

Background

A wireless communication protocol may support multicast transmission. For example, the Institute of Electrical and Electronics Engineers (IEEE) 802.11ax standard (current proposals and/or future versions) supports multicast transmission. In a multicast transmission, an access point (AP) may transmit a frame to a group of stations who have joined a multicast group. This is in contrast to a broadcast transmission where an AP transmits a frame to all stations in a wireless local area network (WLAN), or a unicast transmission where an AP transmits a frame to a single station in the WLAN.

A multicast transmission is an efficient way to transmit a large amount of data (e.g., real time audio and video) to a group of stations in a WLAN. A multicast transmission may be more efficient than a unicast transmission because an AP only has to generate a single frame, and this single frame can be simultaneously sent to all stations in a multicast group. In contrast, in a unicast transmission, an AP has to generate a separate frame for each station. Thus, a multicast transmission is often more efficient than a unicast transmission in terms of bandwidth conservation.

A multicast transmission is similar to a broadcast transmission. Both involve the transmission of a frame to multiple stations. However, receiving stations may handle multicast and broadcast transmissions differently. Specifically, because a broadcast transmission is intended for all stations in a WLAN, all stations need to remain awake and decode the entire frame. In contrast, a multicast transmission is often intended only for a group of stations in a WLAN. Therefore, a power saving opportunity exists for other group addressed stations not in a particular multicast group. Specifically, a station in one multicast group does not need to stay awake to decode a multicast frame that is not destined for the station. Because the station does not need to decode the multicast frame, the station avoids performing decode processing which reduces power consumption.

But often a station in one multicast group may need to stay awake to decode a multicast frame not destined for the station. This is because the multicast frame may be included in a multiuser physical layer protocol data unit (MU-PPDU) frame along with one or more frames that are destined for the station. In other words, a MU-PPDU frame may include one or more subframes, and a portion of the subframes may be destined for the station and a portion of the subframes may not be destined for the station. Therefore, when a station in one multicast group receives an MU-PPDU frame containing a subframe destined for it and a multicast subframe not be destined for it, the receiving station may still need to decode the multicast subframe. This unnecessarily increases the time to process the MU-PPDU frame and increases power usage of the receiving device.

SUMMARY

According to some embodiments, a request frame including a multicast group address for a multicast group can be used to determine a multicast identifier for performing multicast communication using a wireless communications protocol. In some embodiments, the wireless communications protocol may be for the Institute of Electrical and Electronics Engineers (IEEE) 802.11ax standard (current proposals and/or future versions) or various other wireless communication protocols.

In some embodiments, an access point receives a request frame for a wireless communications protocol from a station (STA). In some embodiments, the request frame may be an association identifier (AID) switch request frame. In some embodiments, the request frame may be an add block acknowledgment (ADDBA) request frame. In some embodiments, the request frame may be a new type of action management frame in accordance with a standard, such as the IEEE 802.11ax standard (current proposals and/or future versions) or various other wireless communication protocols In some embodiments, the request frame includes a multicast group address for a multicast group in a field of the request frame. The multicast group address enables the AP to determine a multicast identifier (e.g., a multicast association identifier (AID)) for the multicast group. The AP transmits a response frame including the determined multicast identifier to the STA. In some embodiments, the response frame may be an AID switch response frame. In some embodiments, the response frame may be an ADDBA response frame. In some embodiments, the response frame may be a new type of action management frame in accordance with a standard, such as the IEEE 802.11ax standard (current proposals and/or future versions) or various other wireless communication protocols. Thereafter, the STA maps the determined multicast identifier to the multicast group to perform selective processing of multicast frames in a multi-user transmission.

In some embodiments, an STA receives a multi-user frame for a wireless communications protocol during a multi-user transmission from an AP. The multi-user frame may be a multiuser physical layer protocol data unit (MU-PPDU) frame that includes a preamble and an aggregated set of subframes. The aggregated set of subframes may include a multicast subframe. The preamble may contain a multicast identifier associated with the multicast subframe. The STA determines whether the multicast subframe is destined for the STA based on a comparison of the multicast identifier in the preamble and a determined multicast identifier associated with a multicast group for which the STA is a member. As discussed above, the STA may determine the multicast identifier according to some embodiments. The STA determines whether to decode the multicast subframe based on the determination of whether the multicast subframe is destined for the STA. The STA decodes the multicast subframe if the STA determines the multicast subframe is destined for the STA. The STA skips decoding the multicast subframe if the STA determines the multicast subframe is not destined for the STA Other features of the present disclosure will be apparent from the accompanying drawings and from the detailed description.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for selectively processing multicast frames in multi-user transmissions. Some embodiments operate by transmitting a request frame that includes a group address for a multicast group to an access point (AP). Some embodiments receive a response frame that includes a determined multicast identifier associated with the multicast group from the AP. Some embodiments receive a multi-user frame including a preamble and a multicast subframe from the AP. The preamble may include a multicast identifier associated with the multicast subframe. Some embodiments determine whether the multicast subframe is intended for a receiver device based on the determined multicast identifier and the multicast identifier in the preamble. Some embodiments decode the multicast subframe based on the determination that multicast subframe is intended for the receiver device. Some embodiment skip decoding the multicast subframe based on the determination that multicast subframe is not intended for the receiver device.

A wireless communication protocol may support multicast transmission. For example, the Institute of Electrical and Electronics Engineers (IEEE) 802.11ax standard (current proposals and/or future versions) supports multicast transmission. In a multicast transmission, an access point (AP) may transmit a frame to a group of stations who have joined a multicast group. This is in contrast to a broadcast transmission where an AP transmits a frame to all stations in a wireless local area network (WLAN), or a unicast transmission where an AP transmits a frame directly to a single station.

Figure 1:
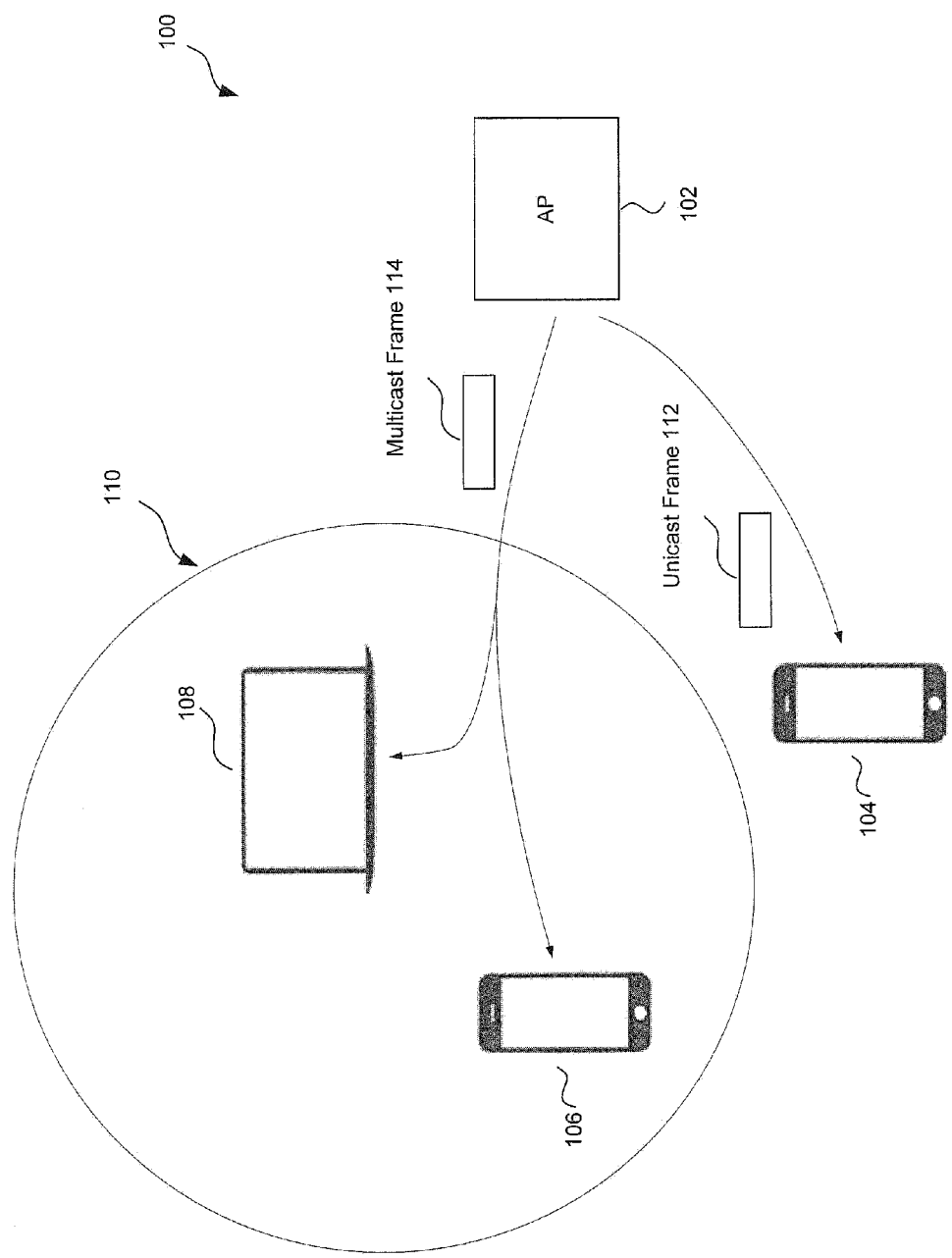
FIG. 1 illustrates an example system implementing multicast in multiuser transmissions, according to some embodiments.

FIG. 1 illustrates an example system 100, according to some embodiments of the disclosure. System 100 includes an access point (AP) 102, an electronic device (e.g., a smartphone) 104, an electronic device (e.g., a smartphone) 106, and an electronic device (e.g., a laptop) 108. Electronic devices 104, 106, and 108 may be considered stations (STAs) in a WLAN. Together with AP 102, electronic devices 104, 106, and 108 form a basic service set (BSS). A BSS may be a single AP together with all associated stations. It is to be appreciated that system 100 may include other electronic devices in addition to or in place of the electronic devices illustrated in FIG. 1 without departing from the scope and spirit of this disclosure. These other electronic devices include, but are not limited to, a desktop computer, laptop, smartphone, touchpad, wearable electronic device, smart watch, or other smart electronic device.

AP 102 may perform unicast, multicast, and broadcast transmissions to electronic devices 104, 106, and 108. AP 102 may perform these transmissions using a wireless local network connection (such as, but not limited to, IEEE 802.11 standard, which is sometimes referred to as "Wi-Fi") or another wireless connection. For illustration purposes, examples will be provided in the context of an IEEE 802.11ax network.

In FIG. 1, AP 102 transmits a unicast frame 112 directly to electronic device 104. In some embodiments, AP 102 may transmit unicast frame 112 to electronic device 104 based on an association identifier (AID) for electronic device 104. An AID is an identifier that identifies an STA in a BSS. AP 102 may indicate unicast frame 112 is destined for electronic device 104 by including the AID for electronic device 104 in unicast frame 112.

In FIG. 1, AP 102 simultaneously transmits multicast frame 114 to electronic devices 106 and 108. AP 102 may simultaneously transmit multicast frame 114 to electronic devices 106 and 108 by transmitting multicast frame 114 to multicast group 110. A multicast group is a collection of logically related STAs sharing a multicast group address. The logically related STAs receive a multicast frame destined for a multicast group address associated with the multicast group. In FIG. 1, electronic devices 106 and 108 are members of multicast group 110. AP 102 may transmit multicast frame 114 to electronic devices 106 and 108 by transmitting multicast frame 114 to a multicast group address associated with multicast group 110.

A multicast transmission is often intended only for a group of STAs in a BSS. Therefore, an STA in one multicast group does not need to stay awake to decode a multicast frame that is not destined for the STA. Because the multicast frame is not destined for the STA, the STA may be able to avoid decoding the multicast frame which reduces power consumption. Thus, a power saving opportunity may exist for other group addressed STAs not in a particular multicast group.

But this power saving opportunity may not exist in a multi-user multicast transmission. This is because a multi-user transmission may involve a single frame that contains subframes destined for a STA, as well as subframes not destined for the STA. Thus, a STA may have to stay awake to decode a multicast frame received during a multiuser transmission even though the multicast frame is not destined for the STA.

Figure 2:
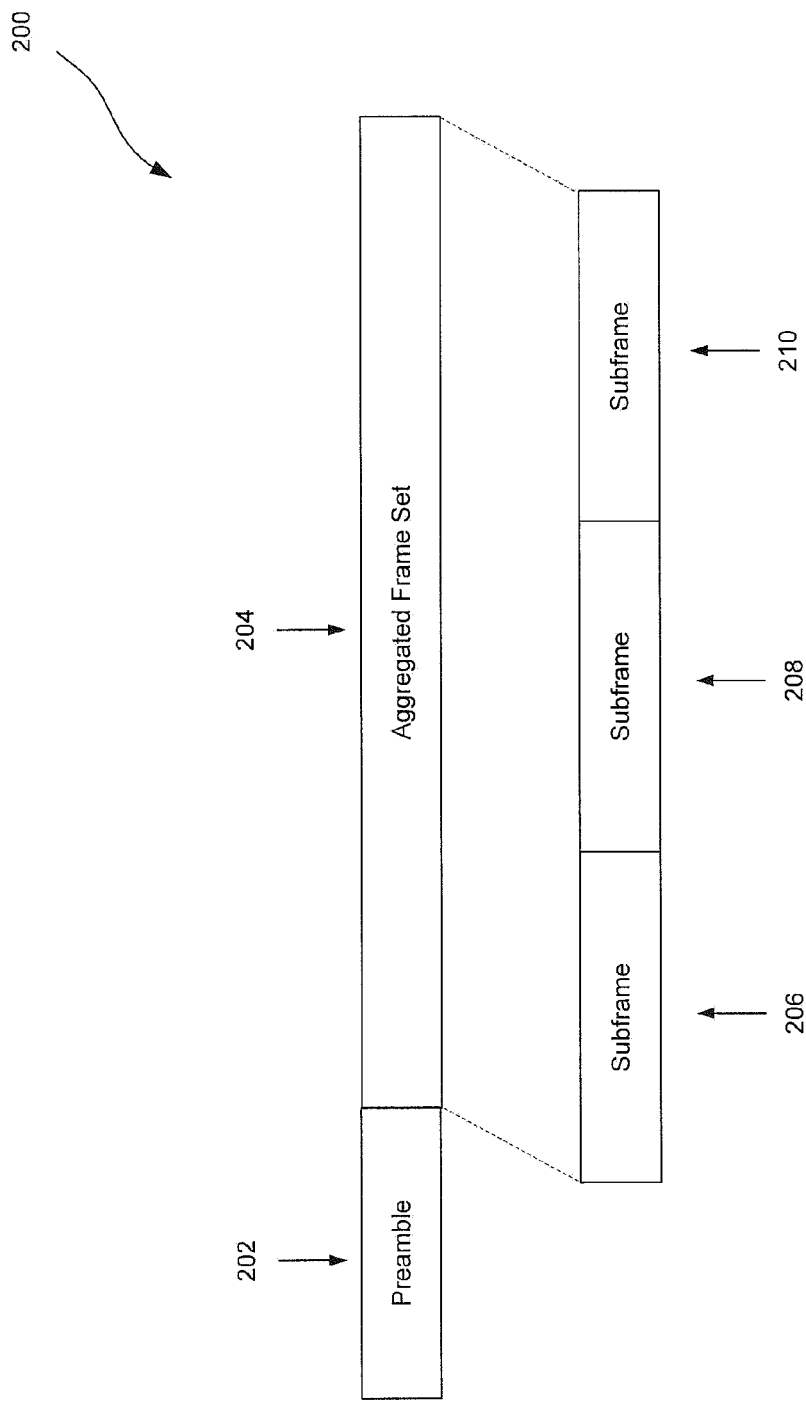
FIG. 2 is an illustration of an example multiuser physical layer protocol data unit (MU-PPDU) frame containing multiple subframes for a wireless local area network (WLAN), according to some embodiments.

FIG. 2 is a block diagram of an example multiuser physical layer protocol data unit (MU-PPDU) frame 200 for multi-user transmission to address the above issue, according to some embodiments. For example, in FIG. 1, AP 102 may transmit MU-PPDU frame 200 containing multicast frame 114 to electronic devices 106 and 108. In some embodiments, MU-PPDU frame 200 may be transmitted in accordance with a standard, such as the IEEE 802.11ax standard (current proposals and/or future versions) or various other wireless communication protocols.

In some embodiments, MU-PPDU frame 200 may include a preamble 202 and an aggregated frame set 204. Preamble 202 may be a physical layer (PHY) preamble and include scheduling information for one or more receiving STAs. The scheduling information may indicate how a receiving STA should process one or more subframes in aggregated frame set 204. Preamble 202 may include the scheduling information in one or more fields in accordance with a standard, such as the IEEE 802.11ax standard (current proposals and/or future versions) or various other wireless communication protocols. In some embodiments, preamble 202 may be a high efficiency (HE) preamble for the IEEE 802.11ax standard (current proposals and/or future versions) and include an HE-Signal-B (HE-SIG-B) field.

In some embodiments, a receiving STA may process preamble 202 before processing aggregated frame set 204. Specifically, the receiving STA may process the scheduling information in preamble 202 to determine how to process the one or more subframes in aggregated frame set 204.

In some embodiments, aggregated frame set 204 may include one or more subframes, e.g., subframes 206, 208, and 210. A portion of the one or more subframes (e.g., subframes 206 and 208) may be destined for a set of one or more STAs, and a different portion of the one or more subframes may be destined for a different set of one or more STAs (e.g., subframe 210). This aggregation of one or more subframes into a single frame increases throughput because frame management information only needs to be specified once per frame, e.g., in preamble 202 of MU-PDDU frame 200.

Traditionally, using an MU-PDDU frame for a multicast transmission may increase power consumption at a receiving STA. This is because the receiving STA may still need to decode a multicast subframe in MU-PPDU frame, even though the multicast subframe may not be destined for the receiving STA. This is because the receiving STA does not know if the multicast frame in MU-PPDU frame is destined for it until after decoding it. As a result, the receiving STA will still attempt to decode the multicast frame in MU-PPDU frame. This may increase the time to process MU-PPDU frame and increase power usage at the receiving STA.

This potentially unnecessary decoding and power usage may be addressed by including an identifier for multicast traffic in MU-PPDU frame 200. Specifically, to identify whether MU-PPDU frame 200 contains a particular multicast of interest to a receiving STA, an identifier may be included in preamble 202. In some embodiments, this identifier may be included in an HE-SIG-B field of preamble 202.

In some embodiments, the identifier may be association identifier (AID) that specifies a multicast group instead of a particular STA. In other words, the identifier is a multicast AID. In some embodiments, a multicast AID may be defined to map a multicast group address to one or more AIDs.

In some embodiments, by including an identifier that specifies a multicast group in preamble 202 (e.g., a multicast AID), a receiving STA can quickly determine whether a multicast subframe in MU-PPDU frame 200 is destined for the receiving STA. In some embodiments, the receiving STA compares the multicast AID in preamble 202 to the multicast AID of the multicast group for which the receiving STA is a member. If the multicast AID in preamble 202 is identical, or logically equivalent, to the multicast AID of the multicast group for which the receiving STA is a member, the multicast subframe is destined for the receiving station. If not, the multicast subframe is not destined for the receiving STA and can be ignored.

More specifically, if the multicast subframe is destined for the receiving STA, the receiving STA can decode the multicast subframe in MU-PPDU frame 200. On the other hand, if the multicast subframe is not destined for the receiving STA, the receiving station can skip decoding the multicast subframe in MU-PPDU frame 200. Because the receiving STA may need to process preamble 202 anyways, there is no substantial increase in compute time to the receiving STA. Moreover, because preamble 202 is often substantially shorter in length than aggregated frame set 204, the receiving STA may not need to allocate significant processing time or storage to the determination.

However, to determine whether the multicast AID in preamble 202 specifies a multicast group for which the receiving STA is a member, the receiving station needs a way to determine the multicast AID of the multicast group for which the receiving STA is a member. In some embodiments, at least three different mechanisms may be used by an STA to determine a multicast AID of a multicast group for which the STA is a member. Each embodiment involves exchanging request and response frames between the STA and an AP. The request and response frames may be action management frames in accordance with a standard, such as the IEEE 802.11ax standard (current proposals and/or future versions) or various other wireless communication protocols. In some embodiments, an STA may perform this determination prior to receiving a multicast transmission to a multicast group for which the STA is a member. In some other embodiments, a STA may perform this determination after receiving a multicast transmission to a multicast group for which the STA is a member.

First, in some embodiments, an STA may determine a multicast AID of a multicast group for which the STA is a member using an AID switch request frame and an AID switch response frame. Second, in some embodiments, an STA may perform the determination using an add block acknowledgment (ADDBA) request frame and an ADDBA response frame. Third, in some embodiments, an STA may perform the determination using a new type of action management request frame and a new type of action management response frame. The three different mechanisms are discussed in turn.

Figure 3:
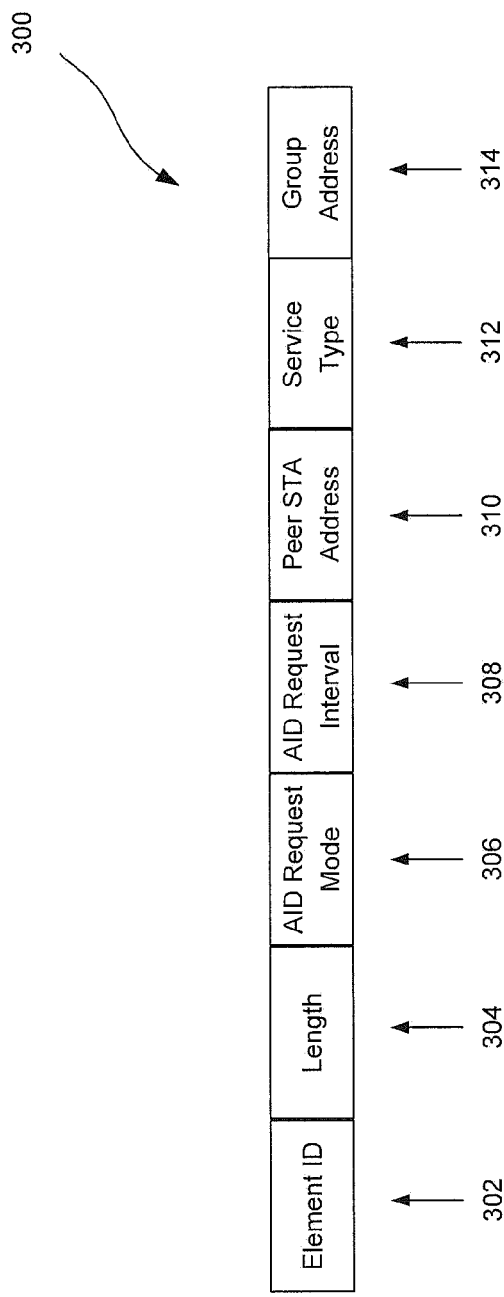
FIG. 3 is a block diagram of an example association identifier (AID) switch request element in an AID switch request frame for determining a multicast AID, according to some embodiments.

FIG. 3 is a block diagram of an example AID switch request element 300 in an AID switch request frame for determining a multicast AID, according to some embodiments. In some embodiments, AID switch request element 300 may be an information element in accordance with a standard, such as the IEEE 802.11ax standard or various other communication protocols. In some embodiments, an AID switch request frame may be an action management frame in accordance with a standard, such as the IEEE 802.11ax standard or various other communication protocols.

In some embodiments, AID switch request element 300 may include an element ID 302, length 304, AID request mode 306, AID request interval 308, peer STA address 310, service type 312, and group address 314. Element ID 302 may identify the type of AID switch element, e.g., an AID switch request element or AID switch response element. Length 304 may specify the length of the AID switch request element 300. AID request mode 306 may indicate whether or not optional fields are included in AID switch request element 300. For example, each bit of AID request mode 306 may indicate whether AID request interval 308, peer STA address 310, service type 312, and group address 314 are present in AID switch request element 300.

In some embodiments, AID request interval 308 may indicate to an AP how often the requesting STA will awaken to listen for beacon frames from the AP. Peer STA address 310 may specify a media access control (MAC) address of a peer STA for STA-to-STA communication. Service type 312 may specify a service type of the requesting STA. Group address 314 may include a group MAC address for the multicast group of the requesting STA.

In some embodiments, an STA may determine a multicast AID of the multicast group for which the STA is a member by setting group address 314 to a multicast group address of the multicast group. The STA may transmit AID switch request element 300 in an AID switch request frame to an AP. Upon receiving the AID switch request frame, the AP may determine the multicast AID of the multicast group for which the STA is a member using the multicast group address in group address 314. In some embodiments, the AP may generate a multicast AID for the multicast group using the multicast group address in group address 314.

In some embodiments, the AP may transmit the multicast AID in an AID switch response frame containing an AID switch response element. As would be appreciated by a person of ordinary skill in the art, an AID switch response element may have a similar format as AID switch request element 300. In some embodiments, the AID switch response element may include an optional group address field similar to group address 314. In some embodiments, the AP may include the multicast AID for the multicast group in the optional group address field of the AID switch response element. The receiving STA may use the determined multicast AID in the optional group address field when receiving future multicast transmissions.

Figure 4:
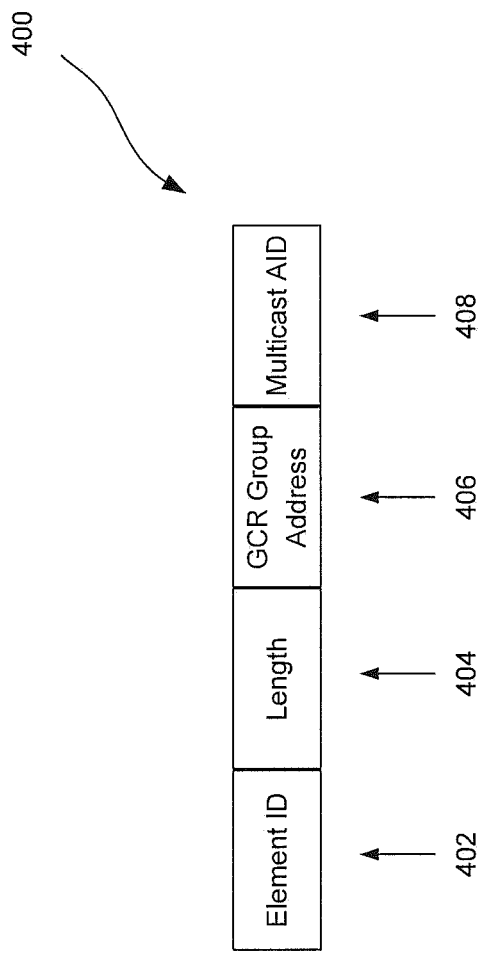
FIG. 4 is a block diagram of an example groupcast with retries (GCR) group address element for determining a multicast AID, according to some embodiments.

FIG. 4 is a block diagram of an example groupcast with retries (GCR) group address element 400 for determining a multicast AID, according to some embodiments. In some embodiments, GCR group address element 400 may be an information element in accordance with a standard, such as the IEEE 802.11ax standard or various other communication protocols. In some embodiments, GCR group address element 400 may be included in an ADDBA request frame or an ADDBA response frame. In some embodiments, an ADDBA request frame and an ADDBA response frame may be action management frames in accordance with a standard, such as the IEEE 802.11ax standard or various other communication protocols.

In some embodiments, an STA may transmit an ADDBA request to an AP to establish a block acknowledgment policy between the STA and the AP. In some embodiments, an STA may transmit an ADDBA request frame containing GCR group address element 400 to an AP to establish a block acknowledgment policy for a multicast group for which the STA is a member. Specifically, the STA may include a multicast group address associated the multicast group in the ADDBA request frame. The multicast group address may be included in GCR group address element 400.

In some embodiments, GCR group address element 400 may include an element ID 402, length 404, and GCR group address 406. Element ID 402 may identify the type of GCR group address element. Length 304 may indicate the length the GCR group address element 400. GCR group address 406 may include a multicast group address for a multicast group for which a block acknowledgment policy is requested.

In some embodiments, an STA may determine a multicast AID of a multicast group for which the STA is a member by including the multicast group address for the multicast group in GCR group address 406. The STA may transmit GCR group address element 400 in an ADDBA request frame to an AP. Upon receiving the ADDBA request frame, the AP may determine the multicast AID of the multicast group for which the STA is a member using the multicast group address in GCR group address 406. In some embodiments, the AP may generate a multicast AID for the multicast group using the multicast group address in GCR group address 406.

In some embodiments, the AP may transmit the multicast AID in an ADDBA response frame containing GCR group address element 400. In some embodiments, GCR group address element 400 may be extended to include a multicast AID field 408. Multicast AID field 408 may include the determined multicast AID associated with the multicast group address of the multicast group for which the STA is a member. The receiving STA may use the determined multicast AID when receiving future multicast transmissions.

Figure 5:
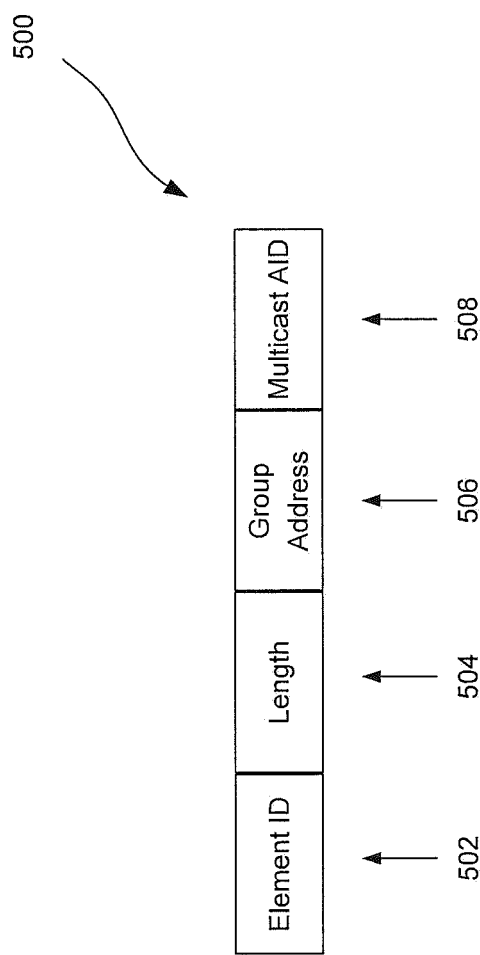
FIG. 5 is a block diagram of an example information element for a new action management frame type for determining a multicast AID, according to some embodiments.

FIG. 5 is a block diagram of an example information element 500 for a new action management frame type for determining a multicast AID, according to some embodiments. In some embodiments, information element 500 may be included in a multicast AID request frame and a multicast AID response frame. In some embodiments, the multicast AID request frame and multicast AID response frame may be action management frames in accordance with a standard, such as the IEEE 802.11ax standard or various other communication protocols. The multicast AID request and multicast AID response frames may be specified as new action management frame types using category and action fields associated with information element 500 in accordance with a standard, such as the IEEE 802.11ax standard or various other communication protocols. In some embodiments, information element 500 may be an information element in accordance with a standard, such as the IEEE 802.11ax standard or various other communication protocols.

In some embodiments, information element 500 may include an element ID 502, length 504, group address 506, and multicast AID field 508. Element ID 502 may identify the type of information element 500. Length 504 may indicate the length of information element 500. Group address 506 may include a multicast group address for a multicast group. Multicast AID field 508 may include the determined multicast AID associated with the multicast group address.

In some embodiments, an STA may determine a multicast AID of a multicast group for which the STA is a member by including the multicast group address for the multicast group in group address 506. The STA may transmit information element 500 in an multicast AID request frame to an AP. Upon receiving the multicast AID request frame, the AP may determine the multicast AID of the multicast group for which the STA is a member using the multicast group address in group address 506. In some embodiments, the AP may generate a multicast AID for the multicast group using the multicast group address in group address 506.

In some embodiments, the AP may transmit the multicast AID in a multicast AID response frame containing information element 500. In some embodiments, multicast AID field 508 may include the determined multicast AID associated with the multicast group address. The receiving STA may use the determined multicast AID when receiving future multicast transmissions.

Figure 6:
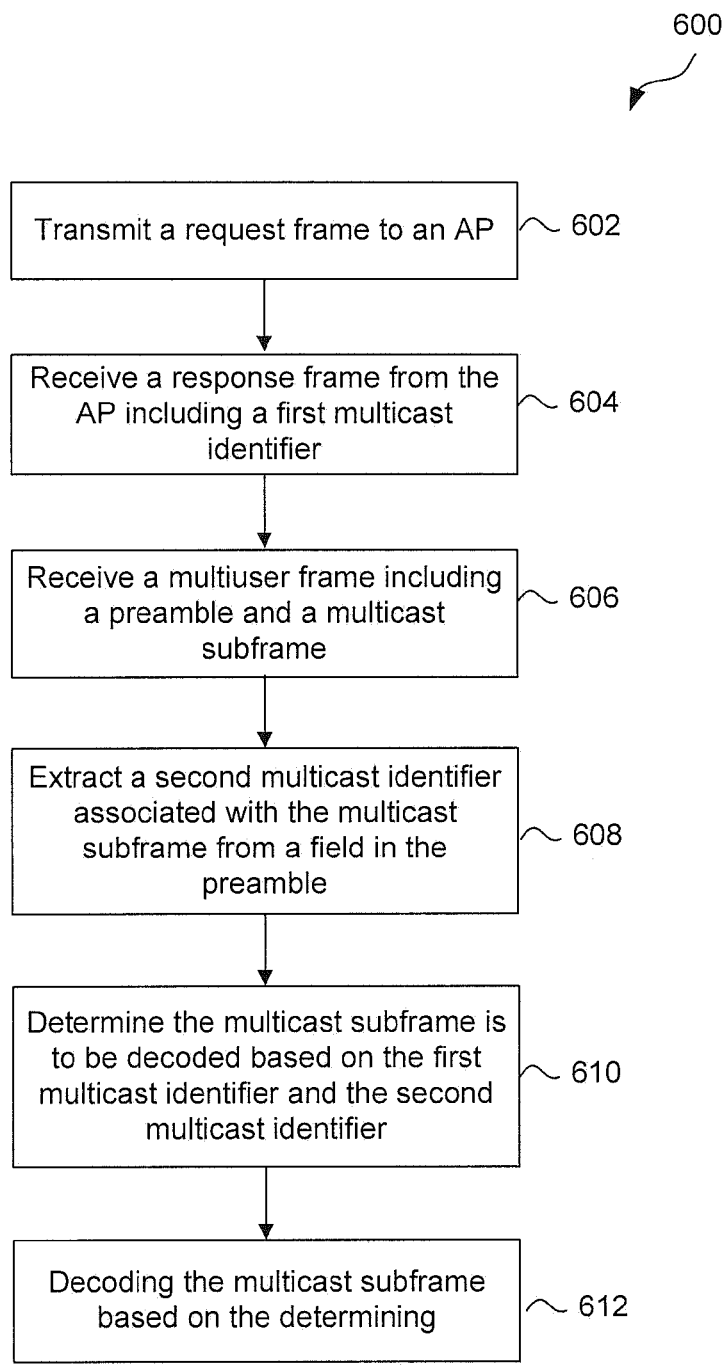
FIG. 6 is a flowchart illustrating an example of selectively processing multicast frames in a multi-user transmission, according to some embodiments.

FIG. 6 is a flowchart of an example method 600 for selectively processing multicast frames in a multi-user transmission, according to some embodiments. Method 600 can be performed by processing logic that can include hardware (e.g., circuitry, dedicated logic, programmable logic, microcode, etc.), software (e.g., instructions executing on a processing device), or a combination thereof.

In 602, an STA transmits a request frame to an AP to determine a multicast AID for a multicast group for which the STA is a member. In some embodiments, the request frame may be an action management frame containing an information element. For example, the request frame may be an AID switch request frame, an ADDBA request frame, or a new frame type such as multicast AID request frame. The request frame may include standard fields, e.g., as specified in the IEEE 802.11ax standard (current proposals and/or future versions) or various other wireless communication protocols. The information element may include standard fields, e.g., as specified in the IEEE 802.11ax standard (current proposals and/or future versions) or various other wireless communication protocols. In some embodiments, the request frame may include a multicast group address in a field in the information element. This multicast group address may indicate the multicast group for which the station is a member.

In 604, the STA receives a response frame from the AP that indicates a first multicast identifier (e.g., multicast AID) for the multicast group for which the STA is a member. In some embodiments, the response frame may be an action management frame containing an information element. For example, the response frame may be an AID switch response frame, an ADDBA response frame, or a new frame type such as multicast AID response frame. The response frame may include standard fields, e.g., as specified in the IEEE 802.11ax standard (current proposals and/or future versions) or various other wireless communication protocols. The information element may include standard fields, e.g., as specified in the IEEE 802.11ax standard (current proposals and/or future versions) or various other wireless communication protocols. The information element may also include new fields such as a multicast AID field.

In some embodiments, the response frame may include the first multicast identifier (e.g., multicast AID) for the multicast group for which the STA is a member in the information element. In some embodiments, the first multicast identifier may be stored in an optional group address field in the information element in an AID switch response frame. In some embodiments, the first multicast identifier may be stored in a new multicast AID field in the information element.

In some embodiments, the STA may store the first multicast identifier at the STA. In some embodiments, the STA may define a map between the first multicast identifier and STAs associated with the first multicast identifier.

In 606, the STA receives a multi-user frame (e.g., an MU-PPDU) frame containing a multicast subframe from the AP. The multi-user frame may be transmitted in accordance with a standard, such as the IEEE 802.11ax standard (current proposals and/or future versions) or various other wireless communication protocols. In some embodiments, the multi-user frame may include a preamble with a second multicast identifier (e.g., a multicast AID) and an aggregated frame set. In some embodiments, the aggregated frame set may include the multicast subframe associated with the second multicast identifier. The aggregated frame set may include additional subframes such as unicast and broadcast subframes.

In 608, the STA extracts the second multicast identifier from the preamble of the multi-user frame.

In 610, the STA determines whether the extracted second multicast identifier is the same as (or logically equivalent to) the first multicast identifier in 604.

In 612, the STA determines whether to decode the multicast subframe in the multi-user frame based on the whether the extracted second multicast identifier is the same as (or logically equivalent to) the first multicast identifier. In some embodiments, the STA decodes the multicast subframe when the extracted second multicast identifier is the same as (or logically equivalent to) the first multicast identifier. The decoding may involve extracting the multicast subframe, parsing a header of multicast subframe, and passing a payload of the multicast subframe to higher network layers for further processing. In some embodiments, the STA skips decoding the multicast subframe when the extracted second multicast identifier is different than the first multicast identifier.

Figure 7:
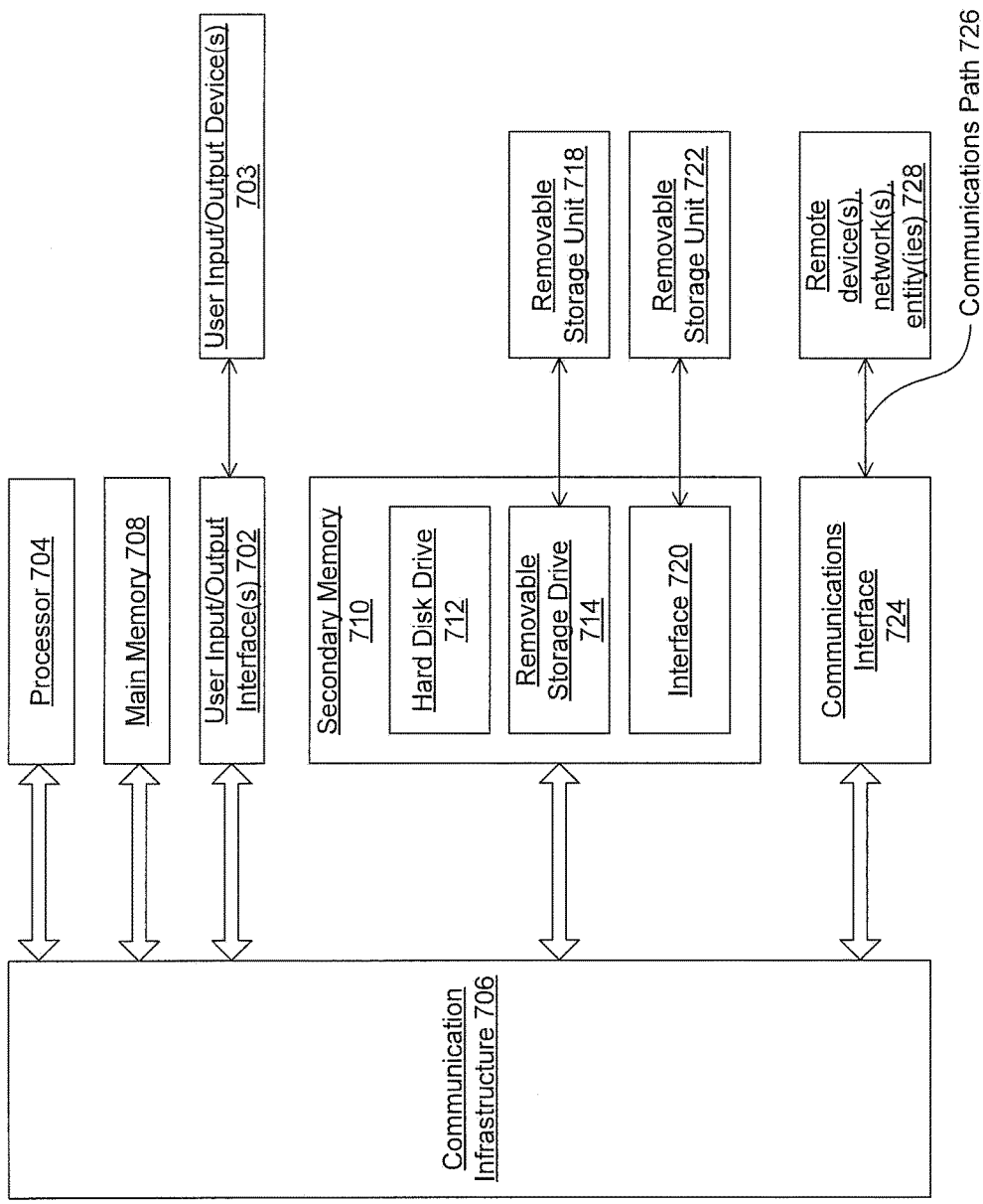
FIG. 7 is an example computer system for implementing various embodiments.

Various embodiments can be implemented, for example, using one or more computer systems, such as computer system 700 shown in FIG. 7. Computer system 700 can be used, for example, to implement method 600 of FIG. 6. For example, computer system 700 can determine a multicast identifier associated with a multicast group for which computer system 700 is a member by transmitting a request frame containing a multicast group address to an AP. Computer system 700 can further selectively process a multicast subframe in a frame based on a multicast identifier included in the frame and the determined multicast identifier for the multicast group, according to some embodiments. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In embodiments, a tangible apparatus or article of manufacture including a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for processing, at a receiver device, a multi-user frame corresponding to a wireless communications protocol, comprising:

transmitting a request frame to an access point (AP) to determine a first multicast association identifier (AID) of a multicast group for which the receiver device is assigned, wherein the request frame comprises a multicast group address of the multicast group for which the receiver device is assigned;

receiving a response frame from the AP in response to the transmitting, wherein the response frame comprises the first multicast AID of the multicast group for which the receiver device is assigned;

receiving the multi-user frame from the AP corresponding to the wireless communications protocol, wherein the multi-user frame comprises a preamble and a multicast subframe;

extracting a second multicast AID associated with the multicast subframe from a field in the preamble of the multi-user frame;

determining that the multicast subframe is intended for the receiver device based at least in part on the first multicast AID and the second multicast AID; and decoding the multicast subframe based at least in part on the determining.

2. The method of claim 1, wherein the wireless communications protocol comprises an Institute of Electrical and Electronics Engineers (IEEE) 802.11ax standard.

3. The method of claim 1, wherein the multi-user frame comprises a multiuser physical layer protocol data unit (MU-PPDU).

4. The method of claim 1, wherein the request frame is specified as an AID switch request frame and the response frame is specified as an AID switch response frame.

5. The method of claim 1, wherein the request frame is specified as an add block acknowledgement (ADDBA) request frame and the response frame is specified as an ADDBA response frame.

6. The method of claim 1, wherein the request frame is specified as a standard compliant action management frame type in a category field of the request frame, and the response frame is specified as a standard compliant action management frame type in a category field of the response frame.

7. The method of claim 1, further comprising:
determining not to decode a second multicast subframe in the multi-user frame based at least in part on a comparison of the first multicast AID and the second multicast AID.

8. The method of claim 1, the determining further comprising:
determining that the first multicast AID is equivalent to the second multicast AID.

9. The method of claim 1, wherein the field is a high efficiency signal B (HE-SIG-B) field, and the second multicast AID identifies the multicast group.

10. The method of claim 1, wherein the receiver device processes the preamble before processing the multicast subframe.

11. A system, comprising:
a memory; and
at least one processor coupled to the memory and configured to:
transmit a request frame to an access point (AP) to determine a first multicast association identifier (AID) of a multicast group for which the system is assigned, wherein the request frame comprises a multicast group address a of the multicast group for which the system is assigned;
receive a response frame from the AP in response to the transmitting, wherein the response frame comprises the first multicast AID of the multicast group for which the system is assigned;
receive a multi-user frame from the AP, wherein the multi-user frame comprises a multicast subframe, and a second multicast AID associated with the multicast subframe;
determine that the multicast subframe is intended for the system based at least in part on the first multicast AID and the second multicast AID; and
decode the multicast subframe based at least in part on the determining.

12. The system of claim 11, wherein the request frame is specified as an AID switch request frame and the response frame is specified as an AID switch response frame.

13. The system of claim 11, wherein the request frame is specified as an add block acknowledgement (ADDBA) request frame and the response frame is specified as an ADDBA response frame.

14. The system of claim 11, wherein the request frame is specified as a standard compliant action management frame type in a category field of the request frame, and the response frame is specified as a standard compliant action management frame type in a category field of the response frame.

15. The system of claim 11, wherein the at least one processor is further configured to:
extract the second multicast AID from a field in a preamble of the multi-user frame.

16. The system of claim 11, wherein the at least one processor is further configured to:
determine not to decode a second multicast subframe in the multi-user frame based at least in part on a comparison of the first multicast AID and the second multicast AID.

17. The system of claim 11, wherein the at least one processor is further configured to:
determine the first multicast AID is equivalent to the second multicast AID.

18. A non-transitory computer-readable device having instructions stored thereon that, when executed by at least one computing device, cause the at least one computing device to perform operations comprising:
transmitting a request frame to an access point (AP) to determine a first multicast association identifier (AID) of a multicast group for which the computing device is assigned, wherein the request frame comprises a multicast group address of the multicast group for which the computing device is assigned;
receiving a response frame from the AP in response to the transmitting, wherein the response frame comprises the first multicast AID of the multicast group for which the computing device is assigned;
receiving a multi-user frame from the AP, wherein the multi-user frame comprises a multicast subframe and a second multicast AID associated with the multicast subframe;
determining that the multicast subframe is not intended for a receiver the computing device based at least in part on the first multicast AID and the second multicast AID; and
deciding not to decode the multicast subframe based at least in part on the determining.

19. The computer-readable device of claim 18, wherein the request frame is specified as an AID switch request frame and the response frame is specified as an AID switch response frame.

20. The computer-readable device of claim 18, wherein the request frame is specified as an add block acknowledgement (ADDBA) request frame and the response frame is specified as an ADDBA response frame.

21. The computer-readable device of claim 18, wherein the request frame is specified as a standard compliant action management frame type in a category field of the request frame, and the response frame is specified as a standard compliant action management frame type in a category field of the response frame.

22. The computer-readable device of claim 18, wherein the operations further comprise:
determining the first multicast AID differs from the second multicast AID.

* * * * *

UNITED STATES PATENT AND TRADEMARK OFFICE
CERTIFICATE OF CORRECTION

PATENT NO. : 10,313,226 B2
APPLICATION NO. : 15/256013
DATED : June 4, 2019
INVENTOR(S) : Li et al.

Page 1 of 1

It is certified that error appears in the above-identified patent and that said Letters Patent is hereby corrected as shown below:

In the Claims

Claim 11, Column 13, Line 24, "group address a of the" should read --group address of the--; and Claim 18, Column 14, Line 31, "for a receiver the computing device" should read --for the computing device--.

Signed and Sealed this
Fifth Day of May, 2020

Andrei Iancu
*Director of the United States Patent and Trademark Office*